(12) United States Patent
Abedijaberi et al.

(10) Patent No.: US 11,584,679 B2
(45) Date of Patent: Feb. 21, 2023

(54) APPARATUSES AND METHODS FOR PROCESSING AN OPTICAL FIBER PREFORM

(71) Applicant: CORNING INCORPORATED, Corning, NY (US)

(72) Inventors: Arash Abedijaberi, Painted Post, NY (US); Elena Alekseevna Chizhova-Notkina, St.Petersburg (RU); Steven Bruce Dawes, Corning, NY (US); Nikolay Anatolyevich Panin, Wilmington, NC (US)

(73) Assignee: Corning Incorporated, Corning, NY (US)

( * ) Notice: Subject to any disclaimer, the term of this patent is extended or adjusted under 35 U.S.C. 154(b) by 120 days.

(21) Appl. No.: 17/114,982

(22) Filed: Dec. 8, 2020

(65) Prior Publication Data
US 2021/0179478 A1 Jun. 17, 2021

Related U.S. Application Data

(60) Provisional application No. 62/946,656, filed on Dec. 11, 2019.

(51) Int. Cl.
*C03B 37/027* (2006.01)
*C03B 37/029* (2006.01)

(52) U.S. Cl.
CPC ...... *C03B 37/02718* (2013.01); *C03B 37/029* (2013.01); *C03B 2205/56* (2013.01)

(58) Field of Classification Search
CPC .......... C03B 37/0146; C03B 37/02718; C03B 37/029
See application file for complete search history.

(56) References Cited

U.S. PATENT DOCUMENTS

| 3,806,570 A | 4/1974 | Flamenbaum et al. |
| 9,618,692 B2 | 4/2017 | Berkey et al. |
| 9,802,858 B2 | 10/2017 | Bookbinder et al. |

(Continued)

FOREIGN PATENT DOCUMENTS

| CN | 101428964 A | 5/2009 |
| EP | 3543218 A1 | 9/2019 |

(Continued)

OTHER PUBLICATIONS

International Search Report and Written Opinion of the International Searching Authority;PCT/US2020/062762; dated Mar. 26, 2021, 11 pages; European Patent Office.

*Primary Examiner* — Lisa L Herring
(74) *Attorney, Agent, or Firm* — Kevin L. Bray (57) ABSTRACT

Apparatuses and methods for processing an optical fiber preform are disclosed. According to one aspect, an apparatus may generally include a muffle defining an interior volume enclosed by at least one sidewall and a handle assembly for supporting the optical fiber preform in the muffle. The handle assembly may be removably coupled to the muffle and extend into the interior volume. At least one baffle may be positioned in the interior volume and define an upper portion of the interior volume and a lower portion of the interior volume. The at least one baffle may define at least one flow channel between the upper portion of the interior volume and the lower portion of the interior volume.

13 Claims, 7 Drawing Sheets

(56) References Cited

U.S. PATENT DOCUMENTS

| | | | |
|---|---|---|---|
| 10,571,628 B2 | 2/2020 | Bookbinder et al. | |
| 2003/0044743 A1* | 3/2003 | Bookbinder | ........ C03B 37/0146 |
| | | | 432/86 |
| 2004/0240814 A1 | 12/2004 | Boek et al. | |
| 2018/0031767 A1 | 2/2018 | Anderson et al. | |

FOREIGN PATENT DOCUMENTS

| | | | | |
|---|---|---|---|---|
| JP | 08002936 A | * | 1/1996 | ......... C03B 37/0146 |
| JP | 2000203862 A | * | 7/2000 | ......... C03B 37/0146 |
| JP | 2001-342032 A | | 12/2001 | |
| JP | 2004250291 A | * | 9/2004 | ....... C03B 37/02718 |
| JP | 2005225733 A | * | 8/2005 | ....... C03B 37/02736 |
| JP | 2013014468 A | * | 1/2013 | ......... C03B 37/0146 |
| WO | 01/38243 A1 | | 5/2001 | |
| WO | 2003/037811 A1 | | 5/2003 | |
| WO | 2006/071865 A2 | | 7/2006 | |
| WO | 2008/062456 A2 | | 5/2008 | |

\* cited by examiner

APPARATUSES AND METHODS FOR PROCESSING AN OPTICAL FIBER PREFORM

CROSS-REFERENCE TO RELATED APPLICATIONS

This application claims the benefit of priority under 35 U.S.C. § 120 of U.S. Provisional Application No. 62/946,656 filed Dec. 11, 2019, entitled "Apparatuses and Methods for Processing an Optical Fiber Preform," the entire contents of which are hereby incorporated by reference.

BACKGROUND

Field

The present specification generally relates to optical fiber preforms and, more particularly, to apparatuses for processing optical fiber preforms.

Technical Background

Optical fiber preforms, such as those used to form optical fibers with halogen doped cores, may be produced through a consolidation process that includes a drying step, an evacuation step, a doping step, and a sintering step. These processes often include exposure of the optical fiber preform to both increased pressure and increased temperature. The final optical fiber preform quality is largely dependent on the temperature distribution along the optical fiber preform during the sintering step. Specifically, the sintering process in regions of the optical fiber preform is governed, at least in part, by the local glass viscosity, which is largely dependent on the local temperature. Uniform temperature distribution and/or a consistent, controllable temperature gradient may be hard to obtain due to the strong impact of the transient gas convection which occurs in the high pressure and high temperature environments necessary for sintering.

Moreover, in order to achieve an optical fiber with the desired optical properties, the optical fiber preform must be processed in an atmosphere that will not introduce contaminants that will impact the optical properties of the consolidated glass. In particular, the presence of transition metals, silanol (SiOH) groups, and residual gases must be extremely low in the processing atmosphere so that these contaminants are not introduced in the final optical fiber preform thereby degrading the optical properties of the preform and fiber subsequently drawn from the preform. However, it has been discovered that low levels of gases other than the process gasses persist in apparatuses used to process optical fiber preforms and can be dissolved into the optical fiber preform during sintering.

Accordingly, a need exists for alternative apparatuses and methods for processing optical fiber preforms that provide both improved thermal control and high purity processing environments.

SUMMARY

According to a first aspect, an apparatus for processing an optical fiber preform includes a muffle defining an interior volume enclosed by at least one sidewall and a handle assembly for supporting the optical fiber preform in the muffle. The handle assembly is removably coupled to the muffle and extending into the interior volume. At least one baffle is attached to the handle assembly and positioned in the interior volume. The at least one baffle defines an upper portion of the interior volume and a lower portion of the interior volume. The at least one baffle defines at least one flow channel between the upper portion of the interior volume and the lower portion of the interior volume A second aspect includes the apparatus of the first aspect, wherein the handle assembly includes a top flange and a support shaft for supporting the optical fiber preform in the muffle. The support shaft extends from the top flange.

A third aspect includes the apparatus of any of the first or second aspects, wherein the at least one baffle extends radially outward from the support shaft.

A fourth aspect includes the apparatus of any of the first through third aspects, wherein the at least one baffle includes a first baffle and a second baffle. The first baffle is positioned at a first longitudinal distance on the support shaft and the second baffle is positioned at a second longitudinal distance on the support shaft. A difference between the first longitudinal distance and the second longitudinal distance is from about 10 mm to about 100 mm.

A fifth aspect includes the apparatus of any of the first through fourth aspects, wherein the first baffle includes a first set of one or more notches and the second baffle includes a second set of one or more notches. The first set of notches and the second set of notches are oriented at different clocking angles.

A sixth aspect includes the apparatus of any of the first through fifth aspects, further including at least one inlet coupled to the muffle and to a process gas source for supplying a process gas to the interior volume and at least one outlet coupled to the top flange for exhausting the process gas from the interior volume.

A seventh aspect includes the apparatus of any of the first through sixth aspects, wherein the at least one flow channel comprises a width from about 0.1 mm to about 15 mm.

An eight aspect includes the apparatus of any of the first through seventh aspects, wherein the at least one flow channel includes a space between the at least one baffle and the at least one sidewall of the muffle.

According to a ninth aspect, a handle assembly for supporting an optical fiber preform includes a top flange and a support shaft for supporting the optical fiber preform. The support shaft extends from the top flange. A preform coupling is disposed in an end of the support shaft distal form the top flange. At least one baffle extends radially outward from the support shaft between the top flange and the preform coupling. The top flange, the support shaft, the preform coupling, and the at least one baffle are formed from fused silica. A radius of the at least one baffle is less than a radius of the top flange.

A tenth aspect includes the apparatus of the ninth aspect, wherein the handle assembly includes a first baffle and a second baffle. The first baffle is positioned at a first longitudinal distance on the support shaft and the second baffle is positioned at a second longitudinal distance on the support shaft. A difference between the first longitudinal distance and the second longitudinal distance is from about 10 mm to about 100 mm.

An eleventh aspect includes the apparatus of any of the ninth or tenth aspects, wherein the first baffle includes a first set of one or more notches and the second baffle includes a second set of one or more notches. The first set of notches and the second set of notches are oriented at different clocking angles.

A twelfth aspect includes the apparatus of any of the ninth through eleventh aspects, further including at least one outlet coupled to the top flange for exhausting a gas.

A thirteenth aspect includes the apparatus of any of the ninth through twelfth aspects, wherein the top flange, the support shaft, the preform coupling, and the at least one baffle are integrally formed from fused silica.

A fourteenth aspect includes the apparatus of any of the ninth through thirteenth aspects, wherein the preform coupling includes a slot corresponding to a connector of the optical fiber preform.

According to a fifteenth aspect, a method for processing an optical fiber preform includes suspending at least one optical fiber preform in an interior volume of a muffle with a handle assembly. The handle assembly includes a top flange and a support shaft supporting the optical fiber preform in the interior volume of the muffle. The support shaft extends from the top flange. A preform coupling is disposed in an end of the support shaft distal from the top flange. The optical fiber preform is attached to the preform coupling. At least one baffle extends radially outward from the support shaft between the top flange and the preform coupling. The at least one baffle defines an upper portion of the interior volume and a lower portion of the interior volume. The method further includes exposing the optical fiber preform to a process gas. The process gas is supplied to the interior volume in the lower portion of the interior volume and is exhausted from the interior volume from the upper portion of the interior volume. The at least one baffle defines at least one flow channel between the upper portion of the interior volume and the lower portion of the interior volume. The process gas passes through the at least one flow channel from the lower portion of the interior volume to the upper portion of the interior volume A sixteenth aspect includes the method of the fifteenth aspect, wherein an average net mass flow rate through the at least one flow channel is from the lower portion of the interior volume to the upper portion of the interior volume.

A seventeenth aspect includes the method of any of the fifteenth through sixteenth aspects, wherein the average net mass flow rate through the at least one flow channel is from about 0.1 slpm to about 10 slpm.

A eighteenth aspect includes the method of any of the fifteenth through seventeenth aspects, wherein the exposing step further comprises exposing the optical fiber preform to a temperature of from about 900° C. to about 1500° C.

A nineteenth aspect includes the method of any of the fifteenth through eighteenth aspects, wherein an average surface temperature of the optical fiber preform is from about 900° C. to about 1450° C.

A twentieth aspect includes the method of any of the fifteenth through nineteenth aspects, wherein a maximum temperature difference on the surface of the optical fiber preform is from about 1° C. to about 300° C.

A twenty-first aspect includes the method of any of the fifteenth through twentieth aspects, wherein the process gas includes a doping gas.

A twenty-second aspect includes the method of any of the fifteenth through twenty-first aspects, wherein the process gas has a pressure greater than 200 kPa.

A twenty-third aspect includes the method of any of the fifteenth through twenty-second aspects, wherein the process gas has a pressure greater than 10,000 kPa.

A twenty-fourth aspect includes the method of any of the fifteenth through twenty-third aspects, wherein the doping gas includes a halogen.

A twenty-fifth aspect includes the method of any of the fifteenth through twenty-fourth aspects, wherein the doping gas includes Cl.

Additional features and advantages of the apparatuses and methods described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1A:
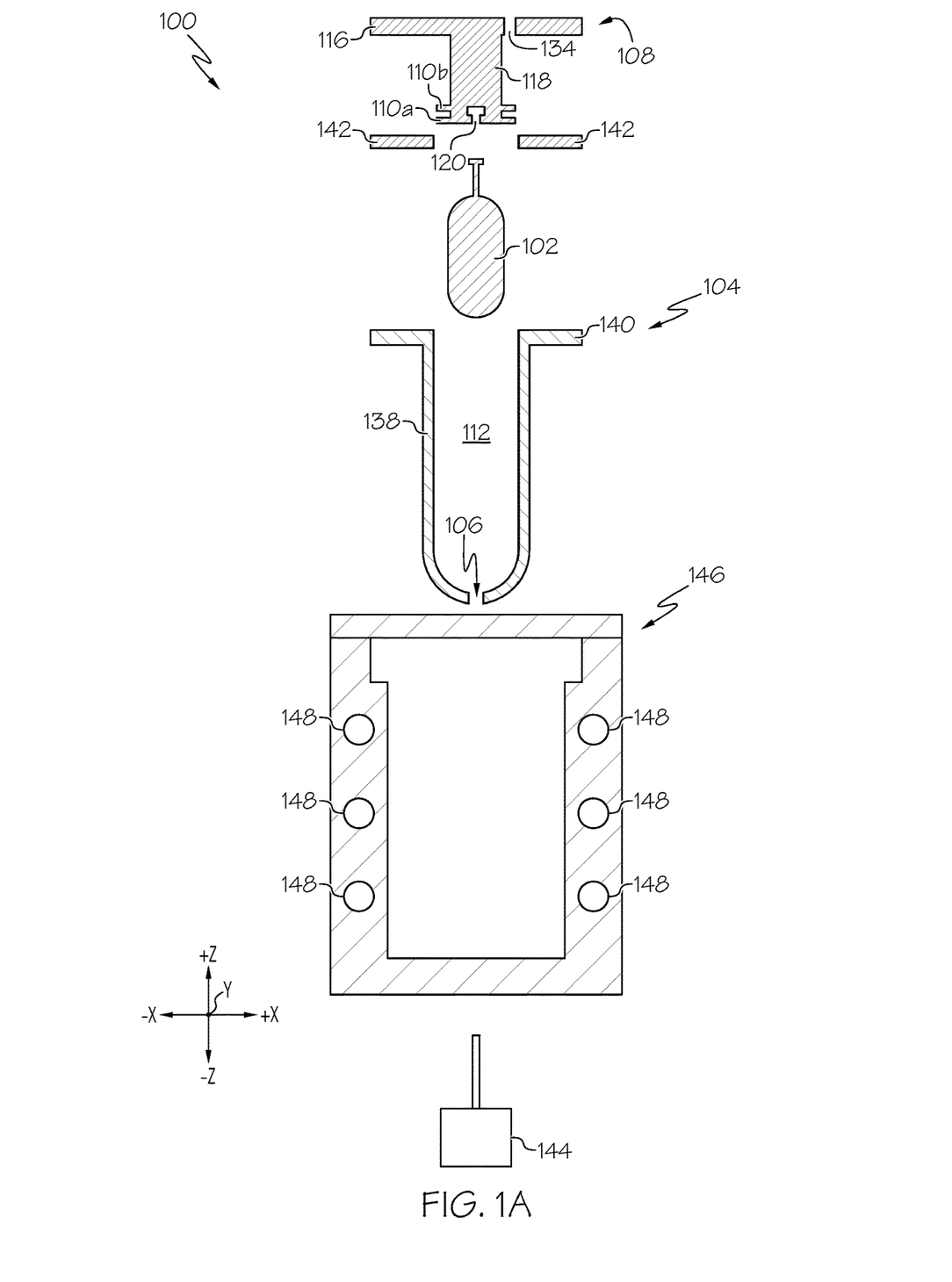
FIG. 1A schematically depicts an exploded view of an apparatus for processing an optical fiber preform, according to one or more embodiments shown and described herein.
Figure 1B:
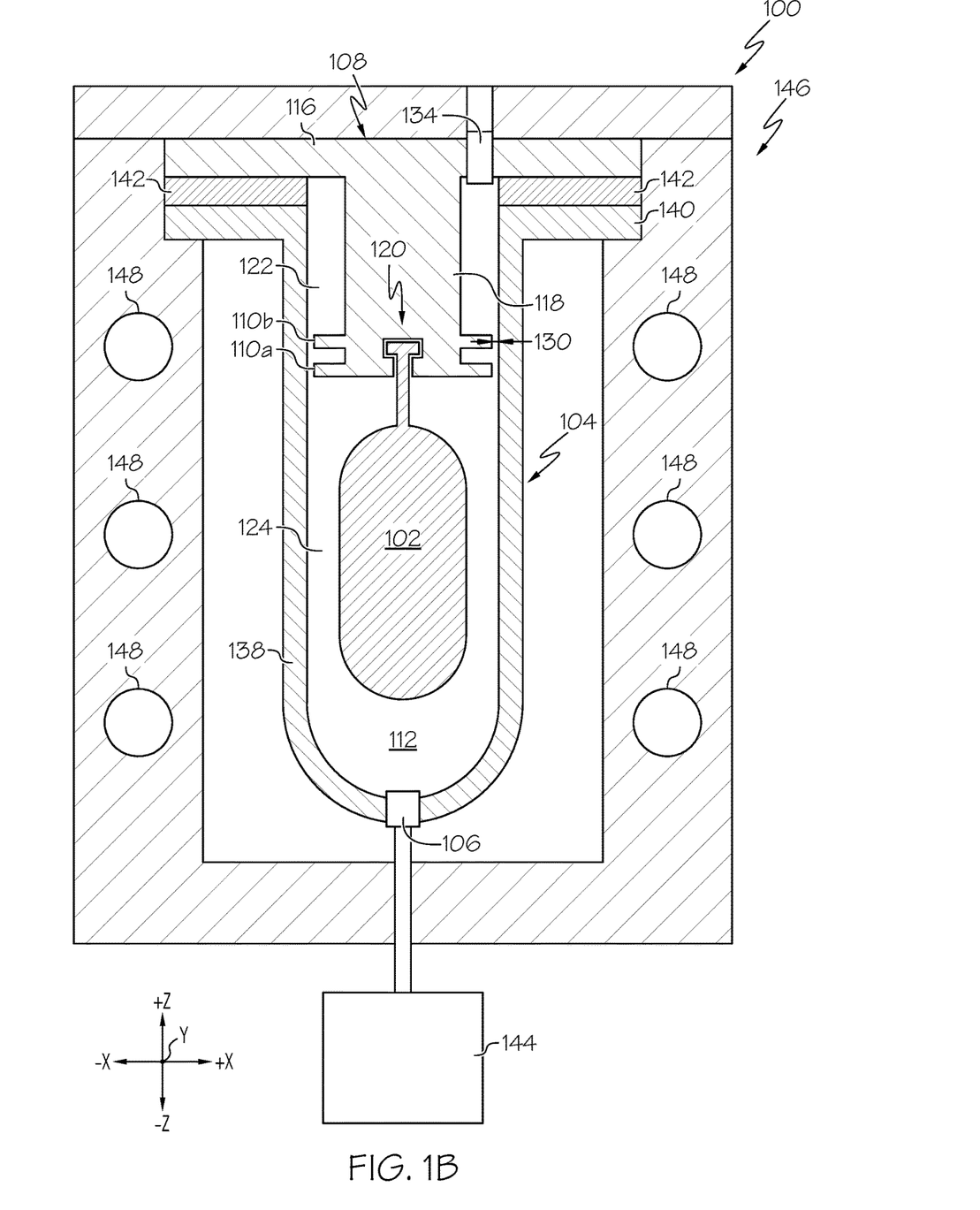
FIG. 1B schematically depicts an assembled view of the apparatus for processing an optical fiber preform of FIG. 1A, according to one or more embodiments shown and described herein.

Reference will now be made in detail to embodiments of apparatuses for processing optical fiber preforms described herein, examples of which are illustrated in the accompanying drawings. Whenever possible, the same reference numerals will be used throughout the drawings to refer to the same or like parts. One embodiment of the apparatus is shown in FIGS. 1A and 1B, and is designated generally throughout by the reference numeral 100. The apparatus generally includes a muffle formed from fused silica and defining an interior volume enclosed by at least one sidewall, a handle assembly for supporting the optical fiber preform in the muffle, and at least one baffle positioned in the interior volume and defining at least one upper portion of the interior volume and at least one lower portion of the interior volume. The handle assembly may be removably coupled to the muffle and extend into the interior volume. The at least one baffle may define at least one flow channel between the at least one upper portion of the interior volume and the at least one lower portion of the interior volume. Various embodiments of apparatuses and methods for processing optical fiber preforms will be described in further detail herein with specific reference to the appended drawings.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

During the processing of an optical fiber preform, such as those where the optical fiber preform is heated, process gas may be heated as it is introduced to the processing environment. As the process gas flows through the processing environment, it may be cooled as well as exposed to potential contaminants. This cooled gas may then become heavy and sink within the processing environment. This creates a convection which reduces the temperature of the processing environment and/or the optical fiber preform positioned therein. Cooling, including localized cooling, of the optical fiber preform may disrupt the processing of the optical fiber preform. In addition, the convection currents may circulate contaminants throughout the processing environment, negatively affecting the optical properties and stability of the optical fiber preform and the optical fiber subsequently drawn therefrom.

The embodiments described herein provide apparatuses for processing optical fiber preforms which allow for improved thermal control of the optical fiber preform. These embodiments may also reduce or mitigate contamination of the processing environment. In particular, the embodiments described herein include baffle structures within a muffle of the apparatus. The baffles define flow paths to facilitate the one-way flow of process gas during processing of an optical fiber preform. The flow paths, in conjunction with the flow of process gas, reduce or mitigate relatively cold, potentially contaminated gas from reentering the processing environment immediately adjacent to the optical fiber preform.

Referring now to FIGS. 1A and 1B, an exploded view (FIG. 1A) and an assembled view (FIG. 1B) of an apparatus 100 for processing an optical fiber preform 102 is schematically depicted. The apparatus 100 generally comprises a furnace 146, a muffle 104, a handle assembly 108, and at least one baffle 110a.

In the embodiments described herein, the muffle 104 may generally comprise at least one sidewall 138, a muffle flange 140, and at least one inlet 106. In embodiments the muffle flange 140 extends radially outward from the sidewall 138 proximate to the top (i.e., the end of the sidewall 138 in the +Z direction of the coordinate axis depicted in the figures). In some embodiments, the muffle flange 140 is substantially perpendicular to the sidewall 138 in a horizontal plane (i.e., the muffle flange 140 extends radially outward from the sidewall 138 in the x-y plane of the coordinate axis depicted in the figures). The muffle 104 defines an interior volume 112 enclosed by the sidewall 138 of the muffle 104. An optical fiber preform 102 may be positioned in the interior volume 112 of the muffle 104 during processing of the optical fiber preform 102. In some embodiments, the muffle 104 is a sealed-end muffle. That is, the muffle 104 only comprises an opening at one end. In some other embodiments (not depicted), the muffle 104 may comprise openings at the top and bottom of the muffle 104.

As described hereinabove, the muffle further comprises at least one inlet 106 sealingly coupled to the muffle 104 and to a process gas source 144 for supplying a process gas to the interior volume 112 of the muffle 104. In some embodiments, the inlet 106 may extend through the sidewall 138 of the muffle 104. As described herein, in some embodiments, the processing of optical fiber preform 102 may comprise flowing a process gas through the interior volume 112 of the muffle 104. This constant flow of process gas may facilitate reducing or mitigating contamination of the processing environment immediately adjacent to the optical fiber preform 102. In particular, the constant flow of process gas may prevent contaminants from being circulated through the interior volume 112 of the muffle 104. Specifically, in some embodiments the process gas may be supplied to the interior volume 112 at one end of the muffle 104 and exhausted from the interior volume 112 at an opposite end of the muffle. This flow of process gas may flush any contaminants from the processing environment as well as prevent additional contaminants from entering the processing environment. In embodiments, the inlet 106 may be sealingly coupled to the muffle 104 at the bottom or sealed end of the muffle 104 (i.e., the end of the muffle 104 in the −Z direction of the coordinate axis depicted in the figures) while the outlet 134 may be located at or proximate to the top end of the muffle 104.

In embodiments, the muffle 104 may be formed from a material which reduces or eliminates contaminates caused by reactions between the process gases and the material of the muffle at elevated temperatures. As discussed hereinabove, it may be advantageous for the processed optical fiber preform 102 to comprise minimal impurities. As such, in some embodiments the optical fiber preform 102 may be processed to a purity encompassing from about 0.1 parts per billion (ppb) to about 1 ppb by weight of impurities such as, for example, transition metals and SiOH. In some embodiments, the optical fiber preform 102 may be processed to a purity encompassing from about 0.2 ppb to about 0.9 ppb, from about 0.3 ppb to about 0.8 ppb, from about 0.4 ppb to about 0.7 ppb, or from about 0.5 ppb to about 0.6 ppb by weight of impurities. Therefore, it may be advantageous for the muffle 104 to be formed from a material that is non-reactive to the process conditions so as to avoid introducing contaminants into the environment due to reactions between the muffle and the processing environment. This facilitates a high purity environment which aids in the production of a high purity optical fiber preform. In that regard, the muffle 104 may be formed from fused silica or quartz due to its unreactive nature and relative inertness, particularly at elevated temperatures. In embodiments, the muffle 104 may be formed from other relatively unreactive materials, such as a ceramic material, for example, silicon carbide (SiC) or silicon nitride ($Si_3N_4$).

Still referring to FIGS. 1A and 1B, in the embodiments described herein the apparatus 100 may further comprise a handle assembly 108 for supporting the optical fiber preform 102 in the muffle 104. The handle assembly 108 may generally comprise a handle flange 116, a support shaft 118, and a preform coupling 120. In embodiments the support shaft 118 extends downward from the handle flange 116 (i.e., the support shaft 118 extends away from the handle flange 116 in the −Z direction of the coordinate axis depicted in the figures). In embodiments, the preform coupling 120 is disposed in the end of the support shaft 118 distal from the handle flange 116 (i.e., the end of the end of the support shaft 118 in the −Z direction of the coordinate axis depicted in the figures). The preform coupling 120 facilitates coupling the optical fiber preform 102 to the handle assembly 108. For example, in embodiments, the preform coupling 120 may comprise a slot comprising and at least one channel. In some embodiments the preform coupling 120 may comprise a t-slot, a dovetail slot, or a fir tree-slot, for example and without limitation.

As noted herein, the handle assembly 108 may support the optical fiber preform 102. As such, the optical fiber preform 102 may comprise a connector corresponding to the geometry of the preform coupling 120. For example, in embodiments where the preform coupling 120 comprises a t-slot the optical fiber preform 102 may comprise a t-connector. In embodiments where the preform coupling 102 comprises a fir tree-slot the optical fiber preform 102 may comprise a fir tree-connector, and so forth. As such, the optical fiber preform 102 may be removably coupled to the preform coupling 120 of the handle assembly 108.

The handle assembly 108 may be removably coupled to the muffle 104 and extend into the interior volume 112 as depicted in FIG. 1B. In embodiments, the handle flange 116 of the handle assembly 108 may be seated on the muffle flange 140 of the muffle 104. In some embodiments, a gasket 142 may be disposed between the handle flange 116 of the handle assembly 108 and the muffle flange 140 of the muffle 104. The gasket 142 may comprise, for example and without limitation, a flexible graphite material. When compressed between the handle flange 116 and the muffle flange 140, the gasket 142 may form an airtight seal between the handle assembly 108 and the muffle 104. That is, the gasket 142 may facilitate the complete sealing of interior volume 112 of the muffle 104. As described hereinabove, a high purity processing environment may result in a higher quality optical fiber and, as such, it may be advantageous to reduce contaminates within the interior volume 112 in some embodiments. In that regard, the creation of an airtight seal between the interior volume 112 and the outside environment may result in a higher purity processing environment and a higher quality optical fiber.

Still referring to FIGS. 1A and 1B, in some embodiments the handle assembly 108 may further comprise at least one outlet 134 extending through the handle flange 116. The outlet 134 may be used for exhausting a process gas from the interior volume 112 of the muffle 104 when the handle assembly 108 is coupled to the muffle 104. As described hereinabove, in some embodiments the constant flow of process gas through the interior volume 112 of the muffle 104 may be facilitated by the supply of process gas to the interior volume 112 at one end of the muffle 104 and the exhaust of the process gas from the interior volume 112 at an opposite end of the muffle 104. As such, in embodiments where the inlet 106 is coupled to the bottom end of the muffle 104, the outlet 134 may be coupled to the handle flange 116 of the handle assembly 108.

In the embodiments described herein, at least one baffle, such as baffles 110a, 110b, may be positioned within the interior volume of the muffle 104. The baffles 110a, 110b extend across the interior volume 112 of the muffle 104 thereby segmenting the interior volume 112 of the muffle 104 into at least one upper portion 122 above the baffles 110a, 110b and at least one lower portion 124 below the baffles 110a, 110b. In some embodiments the baffles 110a, 110b may extend radially outward from the support shaft 118 of the handle assembly 108 between the handle flange 116 and the preform coupling 120. In some embodiments, the baffles 110a, 110b are substantially perpendicular to the support shaft 118 in a horizontal plane (i.e., the baffle 110a, 110b extend radially outward from the support shaft 118 in the x-y plane of the coordinate axis depicted in the figures). As such, in some embodiments the optical fiber preform 102 may be entirely disposed within the lower portion 124 of the interior volume 112. That is, the lower portion 124 of the interior volume 112 of the muffle 104 below the baffles 110a, 110b may comprise the processing environment where the optical fiber preform 102 is processed. The radii of the baffles 110a, 110b may be less than the radius of the handle flange 116. While FIGS. 1A and 1B depict two baffles 110a, 110b, it should be understood that the handle assembly 108 may comprise a single baffle or more than two baffles.

Referring to FIG. 1B, in embodiments the at least one baffle 110a may define at least one flow channel 130 between the at least one upper portion 122 of the interior volume 112 and the at least one lower portion 124 of the interior volume 112. In embodiments, the width of the flow channel 130 is defined between the at least one baffle, such as the baffles 110a, 110b, and the sidewall 138 of the muffle 104. In this regard, the flow channel 130 may include the space between the at least one baffle, such as the baffles 110a, 110b, and the sidewall 138 of the muffle 104. As described herein, the process gas may be supplied to the interior volume 112 through the inlet 106 and pass from the lower portion 124 of the interior volume 112 to the upper portion 122 of the interior volume 112 through the flow channel 130 before being exhausted from the interior volume 112 through the outlet 134. As described hereinabove, the process gas may cool as it flows through the interior volume 112. This cooled process gas may also become contaminated with impurities from sources outside the interior volume 112, such as from atmospheric gases from outside the interior volume 112. The cooled process gas in the upper portion 122 of the interior volume densifies and descends back towards the lower portion 124 of the interior volume 112, possibly introducing impurities to the lower portion 124 of the interior volume 112 as well as reducing the temperature of the lower portion 124 of the interior volume 112. However, the baffles 110a, 110b, in conjunction with the flow of process gas from the inlet 106, may prevent process gas that has passed to the upper portion 122 of the interior volume 112 from re-entering the lower portion 124 of the interior volume 112 thereby maintaining the temperature of the lower portion 124 of the interior volume 112 and reducing or mitigating contamination of the lower portion 124 of the interior volume 112.

In embodiments, the width of the flow channel 130 between the baffles 110a, 110b and the sidewall 138 of the muffle 104 may be from about 0.1 mm to about 15 mm. In embodiments, the width of the flow channel 130 may be from about 1 mm to about 12 mm, from about 2 mm to about 10 mm, from about 3 mm to about 8 mm, or from about 4 mm to about 6 mm. When the width of the flow channel 130 is narrower than 0.1 mm it may prevent adequate flow of the process gas from the at least one lower portion 124 to the at least one upper portion 122 of the interior volume 112. When the width of the flow channel 130 is greater than 15 mm it may fail to prevent cooled process gas from re-entering the at least one lower portion 124 of the interior volume 112. In embodiments, the width of the flow channel 103 may be constant in a circumferential direction. That is, in embodiments, the width of the flow channel may always be, for example, about 0.1 mm. In embodiments, the width of the flow channel 130 may vary along a circumferential direction. That is, in embodiments, the width of the flow channel may be about 0.1 mm at a first point and about 15 mm at a second point.

Figure 2A:
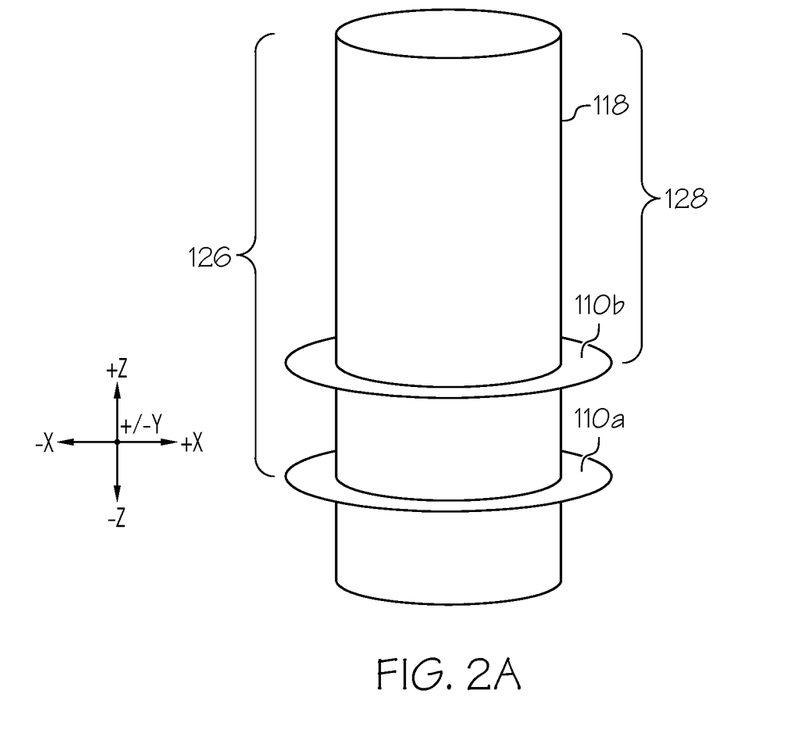
FIG. 2A schematically depicts baffles of an apparatus for processing an optical fiber preform, according to one or more embodiments shown and described herein.

Referring now to FIG. 2A, in embodiments the first baffle 110a and the second baffle 110b are positioned at different longitudinal distances on the support shaft, creating a gap between the first baffle 110a and the second baffle 110b. That is, the first baffle 110a may be positioned at a first longitudinal distance 126 from the top of the support shaft 118 in the −Z direction of the coordinate axis as depicted in FIG. 2A. The second baffle 110b may be positioned at a second longitudinal distance 128 from the top of the support shaft 118 in the −Z direction of the coordinate axis as depicted in FIG. 2A. In embodiments, the difference between the first longitudinal distance 126 and the second longitudinal distance 128 (i.e., the spacing between the first baffle 110a and the second baffle 110b) may from about 10 mm to about 100 mm. In some embodiments, the difference between the first longitudinal distance 126 and the second longitudinal distance 128 may from about 25 mm to about 95 mm, from about 40 mm to about 90 mm, from about 55 mm to about 85 mm, or from about 70 mm to about 80 mm.

Referring again to FIGS. 1A and 1B, in embodiments where the handle assembly 108 comprises two baffles 110a, 110b, cooled process gas may be trapped in the gap between the first baffle 100a and the second baffle 110b, creating a gas domain between the topmost baffle (e.g., baffle 110b) and the bottommost baffle (e.g., baffle 110a). This gas domain may increase the residence time of the cooled process gas in the upper portion 122 of the interior volume 112. This increased residence time may allow the cooled process gas to be reheated, reducing the density of the cooled process gas, and, as such, facilitate the movement of the cooled process gas upward with the flow of the heated process gas from the lower portion 124 of the interior volume 112. In that regard, the gas domain may prevent cooled process gas from re-entering the lower portion 124 of the interior volume 112, which may improve the thermal control (i.e., the ability to maintain a uniform temperature along the entire optical preform or a consistent and desired temperature gradient along the optical fiber preform) of the optical fiber preform 102 and reduce contamination of the processing environment in the lower portion 124 of the interior volume 112.

Figure 2B:
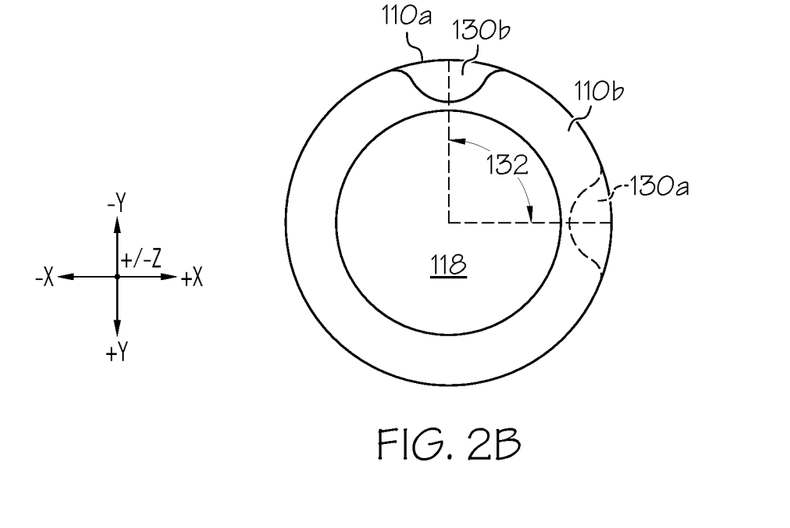
FIG. 2B schematically depicts baffles with notches of an apparatus for processing an optical fiber preform, according to one or more embodiments shown and described herein.

Referring now to FIG. 2B, in some embodiments, the first baffle 110a may comprise a first notch 130a that extends radially inward from the edge of the first baffle 110a. Similarly, the second baffle 110b may comprise a second notch 130b that extends radially inward from the edge of the second baffle 110b. The first notch 130a and the second notch 130b may at least partially define the width of the flow channel 130 depicted in FIG. 1B. That is, in some embodiments a flow path between the at least one upper portion 122 and the at least one lower portion 124 of the interior volume 112 may be at least partially defined by the first notch 130a and the second notch 130b. In embodiments, the first notch 130a and the second notch 130b may be oriented at different clocking angles about the long axis of the support shaft 118 (i.e., the axis of the support shaft 118 extending in the +/−Z-direction of the coordinate axes depicted in the figures). That is, the first notch 130a and the second notch 130b may be rotated relative to each other (i.e., "clocked") by an angle 132 about the long axis of the support shaft 118. In some embodiments, such as those where there are more than two baffles and/or more than two notches, each notch may be oriented at different clocking angles or some notches may be oriented at the same clocking angle while others notches are oriented at different clocking angles. As such, any number of combinations of clocking angles possible given the number of notches may be suitable.

In some embodiments, these clocking angles may at least partially define a flow channel 130 that comprises a "tortuous path." That is, process gas passing from the lower portion 124 of the interior volume 112 to the upper portion 122 of the interior volume 112 or process gas passing from the upper portion 122 of the interior volume 112 to the lower portion 124 of the interior volume 112 would be forced to travel a greater distance through the flow channel 130. This may increase the residence time in the gas domain between the first baffle 110a and the second baffle 110b, as described hereinabove, even further and may further reduce the possibility of cooled process gas from re-entering the lower portion 124 of the interior volume 112, which again may improve the thermal control of the optical fiber preform 102 and reduce contamination of the processing environment of the interior volume 112.

In embodiments, the handle flange 116, the support shaft 118, the preform coupling 120, and the at least one baffle, such as baffles 110a, 110b, may be formed from fused silica. In some embodiments, the handle flange 116, the support shaft 118, the preform coupling 120, and the at least one baffle, such as baffles 110a, 110b, are integrally formed from fused silica. As used herein, "integrally formed" means that the handle flange 116, the support shaft 118, the preform coupling 120, and the at least one baffle, such as baffles 110a, 110b, are formed from a single material without any joints or adhesives. In some embodiments, the handle flange 116, the support shaft 118, the preform coupling 120, and the first baffle 110a are integrally formed from fused silica while the second baffle 110b, formed from fused silica, is coupled to the support shaft 118 by a weld or adhesive.

In embodiments, the muffle 104 and the handle assembly 108 may be seated within a furnace 146. The muffle 104 may be supported within the furnace 146 by the muffle flange 140. The furnace 146 may generally comprise an airtight vessel capable of withstanding the conditions required to process the optical fiber preform 102. The furnace 146 may generally be constructed of a material capable of withstanding the conditions required to process the optical fiber preform 102. For example, the furnace 146 may be a steel high-temperature, high-pressure furnace in some embodiments. In embodiments, the furnace 146 may further include heating elements 148. In some embodiments, the heating elements 148 may be located within the body of the furnace 146. In some embodiments, the heating elements 148 may be located on an interior surface of the furnace 146. The heating elements 148 may be capable of supplying heat to the muffle 104 and to the optical fiber preform 102 suspended within the interior volume 112 of the muffle 104 by the handle assembly 108. The heat supplied by the heating elements 148 may facilitate the steps required for processing of the optical fiber preform 102, such as doping and sintering.

Based on the foregoing, a method for processing an optical fiber preform which allows for improved thermal control of the optical fiber preform and high purity processing environments may be achieved by utilizing the embodiments as disclosed herein.

Referring again to FIG. 1B, the method for processing an optical fiber preform may generally comprise suspending an optical fiber preform 102 in the interior volume 112 of the muffle 104 with the handle assembly 108 and exposing the optical fiber preform 102 to a process gas from a process gas source 144.

In embodiments, the process gas may be supplied from the process gas source 144 to the interior volume 112 of the muffle 104 through the inlet 106 and exhausted from the interior volume 112 of the muffle 104 through the outlet 134. In some embodiments, the process gas comprises chlorine gas ($Cl_2$). Chlorine gas may be suitable to dry the interior volume 112 of the muffle and/or to dry or dope the optical fiber preform 102. That is $Cl_2$ may be suitable to facilitate the removal of moisture, such as water ($H_2O$), from the interior volume 112 of the muffle 104 or from pores of the optical fiber preform 102. In embodiments, $Cl_2$ may be supplied to the interior volume 112 such that the pressure in the interior volume 112 is about $1.0 \times 10^5$ Pa. In other embodiments, the process gas comprises a doping gas. In embodiments, the doping gas comprises a silicon gas ($SiX_4$), wherein X comprises a halogen. For example, in embodiments the doping gas is $Cl_2$, $SiCl_4$, $SiBr_4$, or $SiF_4$. Other doping gases suitable for use in doping an optical fiber preform are also contemplated and possible. For example, in embodiments, the doping gas is nitrogen gas ($N_2$). A doping gas introduces dopants (e.g., halogens) into the composition of the optical fiber preform 102. In some embodiments, the doping gas may be supplied to the interior volume 112 such that the pressure in the interior volume 112 is from about 200 kPa to about 12,000 kPa. In some embodiments, the doping gas may be supplied to the interior volume 112 such that the pressure in the interior volume 112 is form about 500 kPa to about 12,000 kPa, from about 1,000 kPa to about 12,000 kPa, from about 2,000 kPa to about 12,000 kPa, from about 4,000 kPa to about 12,000 kPa, from about 200 kPa to about 10,000 kPa, from about 200 kPa to about 5,000 kPa, from about 200 kPa to about 2,500 kPa, or from about 200 kPa to about 1,250 kPa. In other embodiments, the doping gas may be supplied to the interior volume 112 such that the pressure in the interior volume 112 is greater than 200 kPa, greater than 500 kPa, greater than 1,000 kPa, greater than 2,000 kPa, greater than 4,000 kPa, greater than 6,000 kPa, greater than 8,000 kPa, or greater than 10,000 kPa. The desired pressure within the interior volume 112 may be dependent on the composition of the doping gas as well as the desired level of dopants within the optical fiber preform 102.

In embodiments, the at least one optical fiber preform 102 may also be exposed to a temperature of from about 900° C. to about 1500° C. while being exposed to the process gas. In some embodiments, the at least one optical fiber preform may be exposed to a temperature of from about 1050° C. to about 1500° C., from about 1100° C. to about 1500° C., from about 1150° C. to about 1500° C., from about 1200° C. to about 1500° C., from about 1250° C. to about 1500° C., from about 1300° C. to about 1500° C., from about 1350° C. to about 1500° C., from about 1400° C. to about 1500° C., from about 1450° C. to about 1500° C., from about 1000° C. to about 1450° C., from about 1000° C. to about 1400° C., from about 1000° C. to about 1350° C., from about 1000° C. to about 1300° C., from about 1000° C. to about 1250° C., from about 1000° C. to about 1200° C., from about 1000° C. to about 1150° C., from about 1000° C. to about 1100° C., or from about 1000° C. to about 1050° C. while being exposed to the process gas. The temperature may be achieved by the direct heating of the muffle 104, the heating of the process gas, or both by the heating elements 148 of the furnace 146. The temperature may be suitable to facilitate one or more of drying, doping, or sintering of the optical fiber preform 102.

As described hereinabove, in embodiments the supply and exhaust of the process gas to and from the interior volume 112 of the muffle 104 may be continuous and, as such, a constant flow of process gas through the interior volume 112 of the muffle 104 is created. In some embodiments, the inlet 106 and the outlet 134 are located on opposite ends of the interior volume 112 of the muffle 104. That is, in some embodiments the process gas is supplied to the interior volume 112 through the inlet 106 in the lower portion 124 of the interior volume 112 below the baffle 110a and exhausted from the interior volume 112 through the outlet 134 in the upper portion 122 of the interior volume 112 above the baffle 110a. In such embodiments, the process gas may cool as it flows through the interior volume 112. This may be due to the top of the furnace 146 being relatively cool when compared to the portions comprising the heating elements 148. Cooled process gas may densify, causing the gas to descend towards the lower portion 124 of the interior volume 112. The re-entry of such cooled process gas into the lower portion 124 of the interior volume 112 may result in the formation of low temperature zones in the lower portion 124 of the interior volume 112. These low temperature zones may lower the local surface temperature of portions of the optical fiber preform 102.

As described hereinabove, the baffles 110a, 110b prevent the cooled process gas from re-entering the lower portion 124 of the interior volume 112. In this regard, the baffles 110a, 110b may reduce the downward (i.e., in the –Z direction of the coordinate axis depicted in the figures) mass flow rate of process gas from the upper portion 122 to the lower portion 124 of the interior volume 112. That is, the net mass flow rate of process gas may be from the lower portion 124 of the interior volume 112 to the upper portion 122 of the interior volume 112. As such, in conjunction with the constant flow of process gas, the average net mass flow rate though the flow channel 130 is upward (i.e., the +Z direction of the coordinate axis depicted in the figures). In some embodiments the average net mass flow rate through the flow channel 130 is from about 0.1 standard liters per minute (slpm) to about 10 slpm, from about 0.5 slpm to about 9 slpm, from about 1 slpm to about 8 slpm, from about 1.5 slpm to about 7 slpm, from about 2 slpm to about 6 slpm, from about 2.5 slpm to about 5 slpm, or from about 3 slpm to about 4 slpm. In that regard, in embodiments the baffles 110a, 110b may improve the thermal control of the optical fiber preform 102 within the lower portion 124 of the interior volume 112, such as the average surface temperature of the optical fiber preform 102 and/or a consistent thermal gradient along the surface of the optical fiber preform 102.

As such, in some embodiments described herein, the average surface temperature of the optical fiber preform 102 during processing is from about 900° C. to about 1450° C. In some embodiments, the average surface temperature of the optical fiber preform 102 is from about 950° C. to about 1450° C., from about 1000° C. to about 1450° C., from about 1050° C. to about 1450° C., from about 1100° C. to about 1450° C., from about 1150° C. to about 1450° C., from about 1200° C. to about 1450° C., from about 1250° C. to about 1450° C., from about 1300° C. to about 1450° C., from about 1350° C. to about 1450° C., from about 1400° C. to about 1450° C., from about 900° C. to about 1400° C., from about 900° C. to about 1350° C., from about 900° C. to about 1300° C., from about 900° C. to about 1250° C., from about 900° C. to about 1200° C., from about 900° C. to about 1150° C., from about 900° C. to about 1100° C., from about 900° C. to about 1050° C., from about 900° C. to about 1000° C., or from about 900° C. to about 950° C. Further, in some embodiments the maximum temperature difference across the surface of the optical fiber preform 102 is from about 1° C. to about 300° C. In some embodiments, the maximum temperature difference across the surface of the optical fiber preform 102 is from about 50° C. to about 300° C., from about 100° C. to about 300° C., from about 150° C. to about 300° C., from about 200° C. to about 300° C., from about 250° C. to about 300° C., from about 1° C. to about 250° C., from about 1° C. to about 200° C., from about 1° C. to about 150° C., from about 1° C. to about 100° C., or from about 1° C. to about 50° C.

EXAMPLES

The following examples illustrate one or more features of the present disclosure. It should be understood that these examples are not intended to limit the scope of the disclosure or the appended claims in any manner.

Example 1

Figure 3:
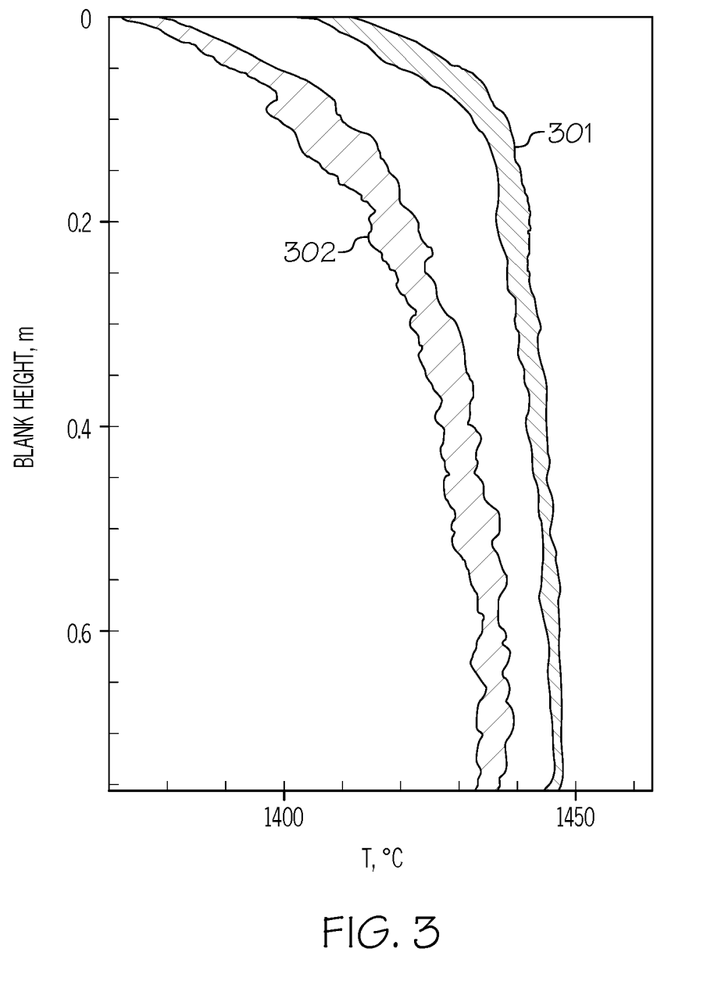
FIG. 3 graphically depicts the average surface temperatures of optical fiber preforms with regard to the height of the optical fiber preforms during processing, as predicted by computational fluid dynamics (CFD) modeling, according to one or more embodiments shown and described herein.

Computational Fluid Dynamics (CFD) predictions of the surface temperature of an optical fiber preform within an apparatus during processing were modeled. In this model, a silica preform having a diameter of 46 mm and a height of 780 mm was attached to a quartz handle assembly and suspended within a quartz muffle having an inner diameter of 135 mm. The interior volume of the muffle was pressurized to approximately 3040 kPa with argon gas and the muffle was heated to a temperature of approximately 1450° C. Both an apparatus without any baffles and an apparatus comprising one baffle defining a 5 mm flow channel were modeled. The surface temperatures were calculated and averaged over time at every height of the optical fiber preform within the muffle. That is a height of 0 m was the top of the optical fiber preform, nearest to the handle assembly, and a height of 0.8 m was the bottom of the optical fiber preform. The results are depicted graphically in FIG. 3. The width of lines 301 and 302 correspond to the surface temperature distribution over the circumference of the preform at the particular height. As shown by line 301, the presence of at least one baffle in the apparatus resulted in a top to bottom optical fiber preform surface temperature of from about 1400° C. to about 1450° C. That is, the maximum temperature difference was about 50° C. across the surface of the optical fiber preform. In contrast, as shown by line 302, an apparatus which did not comprise a baffle resulted in a top to bottom optical fiber preform surface temperature of from about 1370° C. to about 1440° C. That is, the maximum temperature difference was about 70° C. across the surface of the optical fiber preform. Moreover, a comparison of lines 301 and 302 shows a more narrow temperature distribution over the circumference of the preform at nearly every height when the apparatus includes a baffle. As such, the results of the model show that the presence of a baffle, such as those embodiments as described herein, may increase the maximum achievable surface temperature of the optical fiber preform and improve the control of the surface temperature of the optical fiber preform to produce a desired temperature profile.

Example 2

Figure 4:
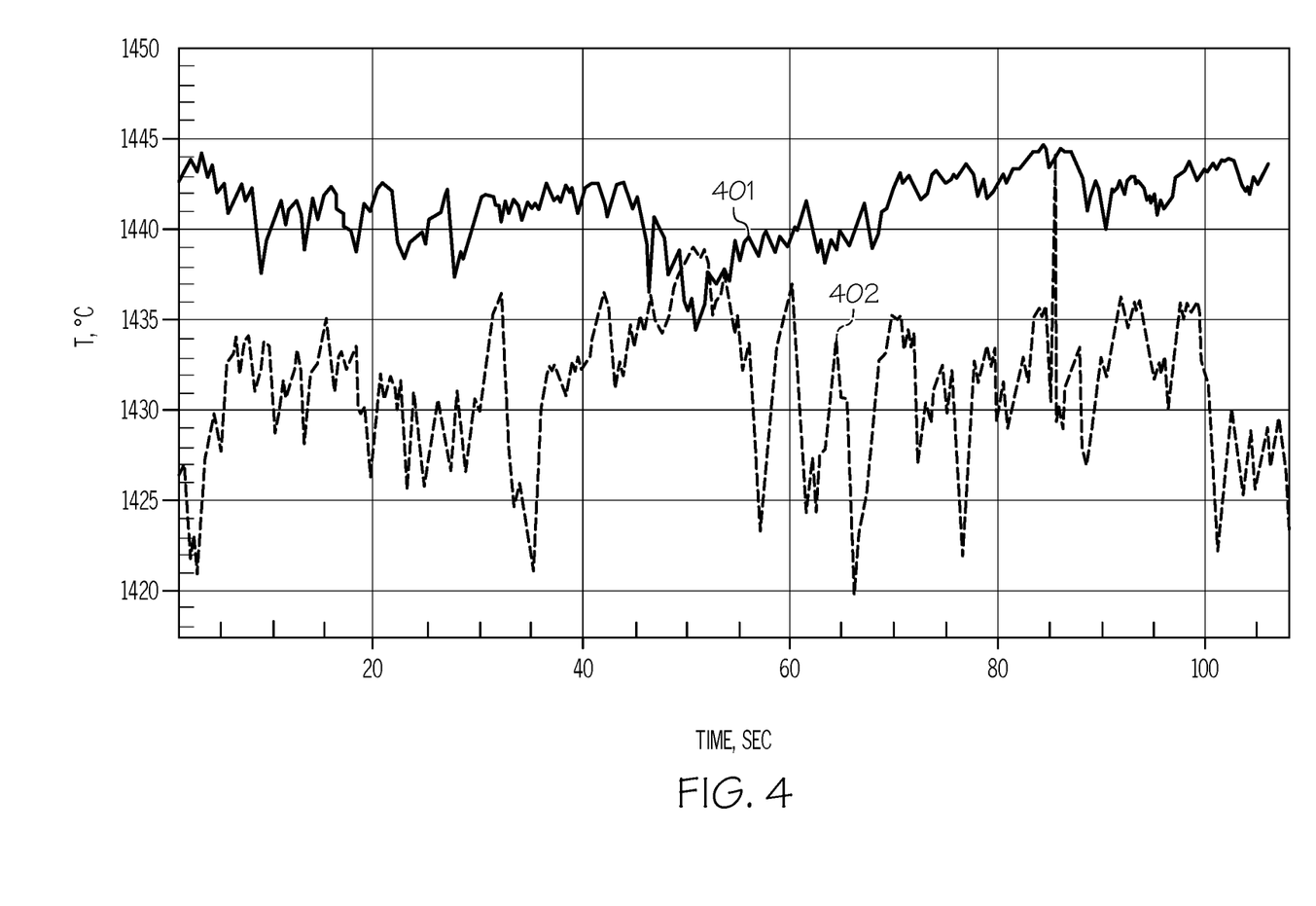
FIG. 4 graphically depicts the average surface temperatures of optical fiber preforms over a span of 2 minutes during processing, as predicted by CFD modeling, according to one or more embodiments shown and described herein.

CFD predictions of the surface temperature of an optical fiber preform within apparatuses during processing were modeled. The model parameters are the same as those described with regard to Example 1. Both an apparatus without any baffles and an apparatus comprising one baffle defining a 5 mm flow channel were modeled. The average surface temperatures of the entire optical fiber preform were calculated over the course of two minutes. The results are depicted graphically in FIG. 4. As shown by line 401, an apparatus which comprises a baffle resulted in a more stable surface temperature with a maximum average surface temperature of about 1445° C. and a minimum average surface temperature of about 1435° C., for a maximum average surface temperature difference of less than or equal to about 10° C. In contrast, as shown by line 402, an apparatus which does not comprise a baffle resulted in relatively erratic surface temperatures with a maximum average surface temperature of about 1440° C. and a minimum average surface temperature of about 1420° C., for a maximum average surface temperature difference of about 20° C. Moreover, the apparatus without a baffle displayed frequent temperature fluctuations of nearly 15° C., over short periods of time (i.e., 5 seconds). As such, the results of the model again show that the presence of a baffle, such as in those embodiments as described herein, may increase the maximum achievable surface temperature of the optical fiber preform and improve the control of the surface temperature of the optical fiber preform.

Example 3

Figure 5:
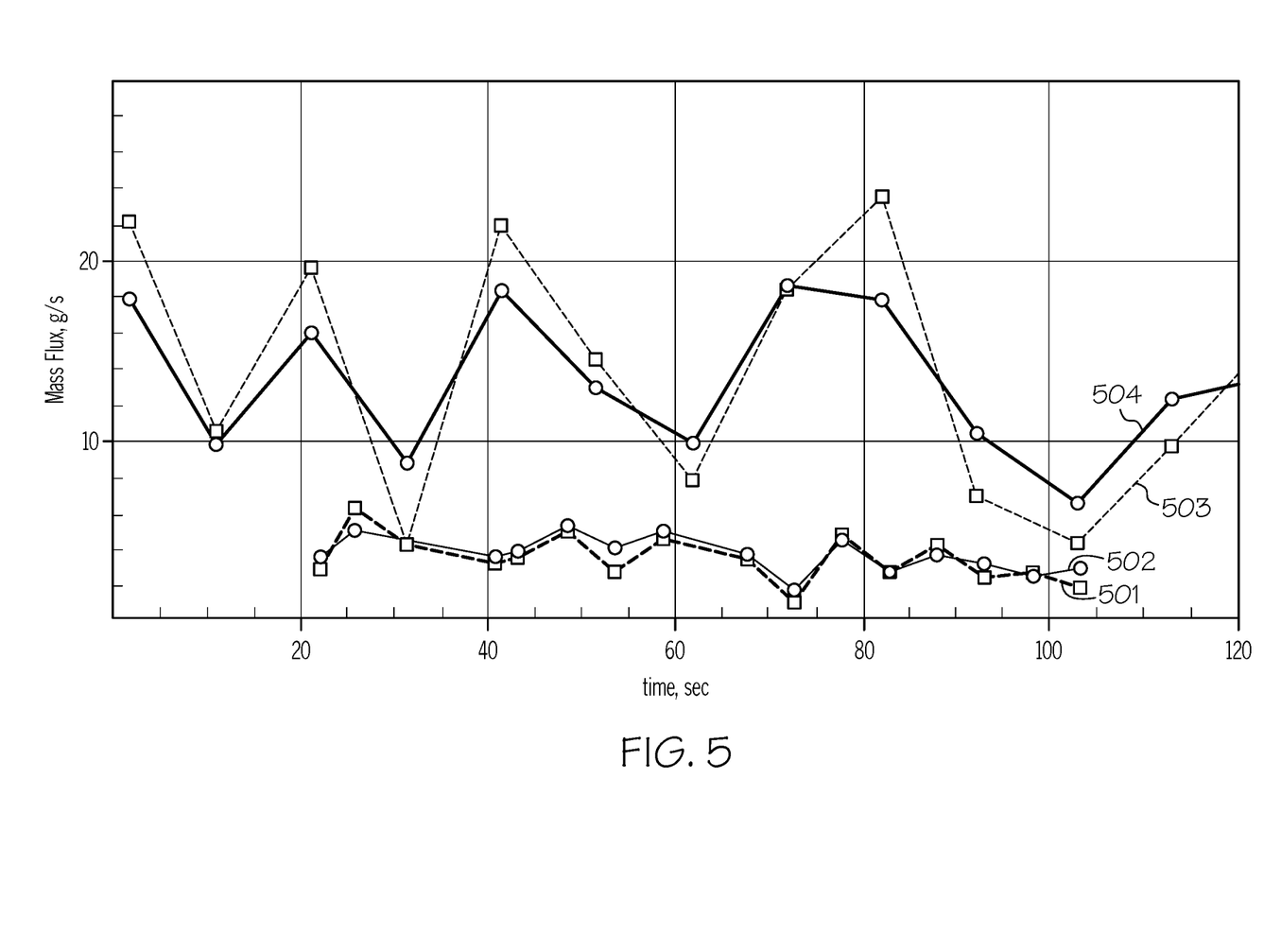
FIG. 5 graphically depicts the average upward and downward mass flow rate within an apparatus over a period of 2 minutes during processing, as predicted by CFD modeling, according to one or more embodiments shown and described herein.

CFD predictions of the average upward and downward mass flow rate within an apparatus during the processing of an optical fiber preform were modeled. The model parameters are the same as those described with regard to Examples 1 and 2. Predictions for both an apparatus without any baffles and an apparatus comprising one baffle defining a 5 mm flow channel were modeled. The results are depicted graphically in FIG. 5. FIG. 5 comparatively plots the average upward (i.e., from the lower portion to the upper portion of the interior volume) mass flow rate (g/s) and the average downward (i.e., from the upper portion to the lower portion of the interior volume) mass flow rate over a period of 2 minutes. As shown by lines 503 and 504, respectively, an apparatus which does not comprises a baffle may provide an average upward mass flow rate of 12.0 g/s and an average downward mass flow rate of 12.4 g/s. That is, apparatuses without at least one baffle may have a net downward mass flow rate which can lead to increased contamination, localized cooling, and decreased optical fiber preform purity. In contrast, as shown by lines 501 and 502, respectively, an apparatus which comprises a baffle may provide a decrease in both upward and downward mas flow rate by over 66% with an average downward mass flow rate of about 3.5 g/s and an average upward mass flow rate of about 3.7 g/s. That is, apparatuses which comprise at least one baffle create a net upward mass flow rate which may effectively reduce or even eliminate the presence of contaminants from the upper portion of the interior volume from falling to the lower portion and affecting the optical fiber preform purity and enhance temperature control.

Example 4

Figure 6:
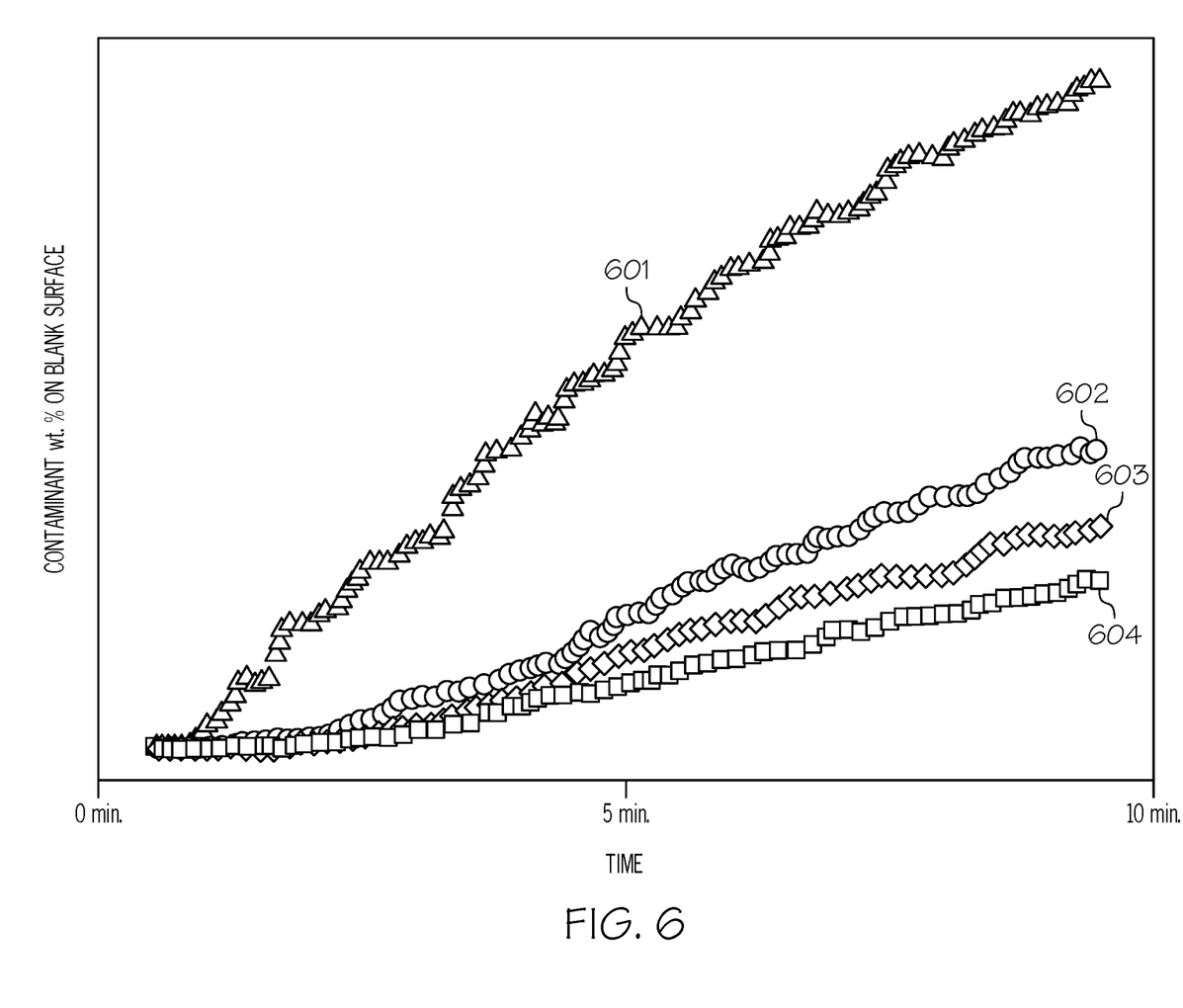
FIG. 6 graphically depicts the level of contaminants present on the surface of an optical fiber preform over a period of 10 minutes, as predicted by CFD modeling, according to one or more embodiments shown and described herein.

CFD predictions of the level of contamination on the surface of the optical fiber preform were modeled. In this model, a silica preform having a diameter of 46 mm and a height of 780 mm was attached to a quartz handle assembly and suspended within a quartz muffle having an inner diameter of 135 mm. Silicon tetrachloride ($SiC_4$) gas was introduced to the interior volume of the muffle at a rate of from 0.0001 slpm to 100 slpm and the muffle was heated to a temperature of approximately 1450° C. Predictions for apparatuses comprising no baffles (line 601), one baffle (line 602), two baffles (line 604), and four baffles (line 603) were modeled. The baffles of the apparatus including four baffles were modeled to each included a notch oriented at a different clocking angle. The average wt. % of contaminants, assumed to have the same material properties of the carrier gas, present on the surface of the optical fiber preform over the course of ten minutes was plotted and is graphically depicted in FIG. 6. As shown by line 601, an apparatus which comprised no baffles resulted in more than double the wt. % of contaminants on the surface of the optical fiber preform when compared to apparatuses which included at least one baffle. As shown by a comparison of line 602 and 604, the apparatus which included two baffles showed a further decrease in contaminants when compared to the apparatus which comprised only one baffle. As such, apparatuses which include a baffle display the ability to provide a processing environment with a much higher purity than apparatuses which do not comprise a baffle. Further, with regard to purity, apparatuses which comprise two baffles may be the most advantageous in terms of reducing contamination.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. An apparatus for processing an optical fiber preform, the apparatus comprising:
    a muffle defining an interior volume enclosed by at least one sidewall;
    a handle assembly for supporting the optical fiber preform in the muffle, the handle assembly removably coupled to the muffle and extending into the interior volume, the handle assembly comprising:
        a top flange, and
        a support shaft for supporting the optical fiber preform in the muffle, the support shaft being integrally formed with and extending from the top flange; and
    at least one baffle attached to the handle assembly and positioned in the interior volume, the at least one baffle defining an upper portion of the interior volume and a lower portion of the interior volume,
    wherein the at least one baffle defines at least one flow channel between the upper portion of the interior volume and the lower portion of the interior volume.

2. The apparatus of claim 1, wherein the at least one baffle extends radially outward from the support shaft.

3. The apparatus of claim 2, wherein the at least one baffle comprises a first baffle and a second baffle, the first baffle positioned at a first longitudinal distance on the support shaft and the second baffle positioned at a second longitudinal distance on the support shaft, wherein a difference between the first longitudinal distance and the second longitudinal distance is from about 10 mm to about 100 mm.

4. The apparatus of claim 3, wherein the first baffle comprises a first set of one or more notches and the second baffle comprises a second set of one or more notches, wherein the first set of notches and the second set of notches are oriented at different clocking angles.

5. The apparatus of claim 2, further comprising at least one inlet coupled to the muffle and to a process gas source for supplying a process gas to the interior volume and at least one outlet coupled to the top flange for exhausting the process gas from the interior volume.

6. The apparatus in claim 1, wherein the at least one flow channel comprises a width from about 0.1 mm to about 15 mm.

7. The apparatus of claim 1, wherein the at least one flow channel comprises a space between the at least one baffle and the at least one sidewall of the muffle.

8. A handle assembly for supporting an optical fiber preform, the handle assembly comprising:
    a top flange;
    a support shaft for supporting the optical fiber preform, the support shaft being integrally formed with and extending from the top flange;
    a preform coupling disposed in an end of the support shaft distal from the top flange; and
    at least one baffle extending radially outward from the support shaft between the top flange and the preform coupling, wherein:
        the top flange, the support shaft, the preform coupling, and the at least one baffle are formed from fused silica; and
        a radius of the at least one baffle is less than a radius of the top flange.

9. The handle assembly of claim 8, wherein the at least one baffle comprises a first baffle and a second baffle, the first baffle positioned at a first longitudinal distance on the support shaft and the second baffle positioned at a second longitudinal distance on the support shaft, wherein a difference between the first longitudinal distance and the second longitudinal distance is from about 10 mm to about 100 mm.

10. The handle assembly of claim 9, wherein the first baffle comprises a first set of one or more notches and the second baffle comprises a second set of one or more notch, wherein the set of first notches and the second set of notches are oriented at different clocking angles.

11. The handle assembly of claim 8, further comprising at least one outlet coupled to the top flange for exhausting a gas.

12. The handle assembly of claim 8, wherein the top flange, the support shaft, the preform coupling, and the at least one baffle are integrally formed from fused silica.

13. The handle assembly of claim 8, wherein the preform coupling comprises a slot corresponding to a connector of the optical fiber preform.

\* \* \* \* \*

UNITED STATES PATENT AND TRADEMARK OFFICE
CERTIFICATE OF CORRECTION

PATENT NO. : 11,584,679 B2  
APPLICATION NO. : 17/114982  
DATED : February 21, 2023  
INVENTOR(S) : Arash Abedijaberi et al.

Page 1 of 1

It is certified that error appears in the above-identified patent and that said Letters Patent is hereby corrected as shown below:

In the Claims

In Column 16, Line 34, in Claim 6, delete "in" and insert -- of --.

Signed and Sealed this
Fifth Day of September, 2023

Katherine Kelly Vidal
*Director of the United States Patent and Trademark Office*